United States Patent [19]

McCormack

[11] Patent Number: 4,733,747
[45] Date of Patent: Mar. 29, 1988

[54] SYSTEM AND METHOD FOR ELIMINATING WAVE FORM DISTORTION IN MULTI-UNIT SEISMIC SOURCE PROSPECTING

[75] Inventor: Michael D. McCormack, Plano, Tex.

[73] Assignee: Atlantic Richfield Company, Los Angeles, Calif.

[21] Appl. No.: 85,820

[22] Filed: Aug. 17, 1987

Related U.S. Application Data

[63] Continuation-in-part of Ser. No. 863,480, May 15, 1986.

[51] Int. Cl.⁴ .............................................. G01V 1/00
[52] U.S. Cl. .................................... 181/107; 367/55; 181/111
[58] Field of Search ............... 181/101, 103, 107, 108, 181/109, 110, 111, 112, 113, 114, 115, 121, 122, 139; 367/13, 21, 22, 23, 24, 27, 34, 38, 39, 40, 41, 42, 50, 55, 56, 57, 59, 140, 141, 190, 189; 364/421, 422

[56] References Cited

U.S. PATENT DOCUMENTS

| | | | |
|---|---|---|---|
| 3,322,230 | 5/1967 | Flatou | 367/55 |
| 3,680,040 | 7/1972 | Silverman et al. | 367/46 X |
| 3,985,199 | 10/1976 | Baird | 181/107 |
| 4,484,657 | 11/1984 | Barta | 181/121 |
| 4,519,053 | 5/1985 | Bedenbonder et al. | 367/190 |

Primary Examiner—Deborah L. Kyle
Assistant Examiner—Brian S. Steinberger
Attorney, Agent, or Firm—Drude Faulconer

[57] ABSTRACT

Individual seismic source units of a surface array activated simultaneously for cumulative reinforcement may initiate seismic waves at slightly different times despite efforts at synchronization. These variations are measured and used to compute an inverse operator which is applied to the summed uncorrected seismic recording so as to undo the distortion they produce.

9 Claims, 5 Drawing Figures

TIME IN MILLISECONDS

SYSTEM AND METHOD FOR ELIMINATING WAVE FORM DISTORTION IN MULTI-UNIT SEISMIC SOURCE PROSPECTING

BACKGROUND OF THE INVENTION

This is a continuation-in-part of application Ser. No. 06/863,480 filed May 15, 1986 entitled "System for Correcting Timing Variations in Land Seismic Sources."

FIELD OF THE INVENTION

This invention relates generally to the field of seismic exploration and more particularly to a system for improving the quality of composite seismic data obtained from arrays of seismic sources.

DESCRIPTION OF THE PRIOR ART

Typically, an array of similar seismic sources are activated or "fired" together by a common electrical signal in conducting a seismic survey in order to insure that adequate energy is available to detect deep reflection events. It is considered essential that the sources used in such a survey must be synchronized insofar as possible so that they initiate acoustic pulses simultaneously in the earth or other medium to be excited. Failure to achieve this synchronization with a high degree of precision results in degradation in the quality of seismic data. This is because of loss of the higher frequencies in the resultant composite wave form. The wave forms of all seismic surface sources operated in multiples, whether impulsive, (for example, the Bolt land air gun or the Atlantic Richfield ARIS ™ seismic source) or vibratory, such as the Conoco Vibroseis ® source, are degraded to some extent because of differences in actual acoustic pulse initation time (the so-called "timebreak") of individual source units that comprise the total source array. This is true both for land and marine sources. Some measurable time interval, usually on the order of several milliseconds, always exists between the instant such a source receives a firing signal, i.e., is activated and the instant of initiation of the resultant pulse in the contiguous medium. This event can readily be detected with the aid of strategically positioned transducers in a manner wellknown to the art. The length of this interval depends upon the type of source, and its particular design. However, since no two sources are ever identical, this interval may vary between units of an array, causing some units to fire early or late. Typically, such interval variation may easily range from zero to several milliseconds, and unless compensated in some manner, the resultant deterioration of the frequency content of the composite source wave form can extend down into the seismic band.

The synchronization of multiple source units has been a long standing problem in the field of seismic exploration. Past procedure has been to synchronize all sources at the beginning of a shooting day. This is usually done by test firing each source, measuring the intervals between firing signal time and pulse initiation time, and making field adjustments until all intervals agree with some preselected nominal value within acceptable tolerance. Unfortunately, as shooting progresses, heat, dirt, metal fatigue, and other factors are likely to upset these adjustments and this creates problems of the character described.

SUMMARY OF THE INVENTION

The present invention provides a method and system for eliminating or substantially reducing distortion in the composite field records obtained from multiple seismic sources operated as an array on land or in a marine environment. In accordance with one aspect of the invention, a composite seismic recording is made representing a vertical superposition of individual seismic signals attributable respectively to simultaneously activated source units of a seismic array, modified by differences in the times at which such sources initiate acoustic pulses in the medium contacted. Transducers detect the actual pulse initiation times which are recorded separately from the composite seismic data traces. These actual pulse initiation times are each compared to a preselected time reference, such as a fixed interval after a common firing signal occurs. The resultant difference values are utilized to construct an inverse mathematical operator in the frequency domain which is multiplied by computer with the Fourier transform of the uncorrected composite seismic record. The inverse Fourier transform of the resultant product yields a composite seismic record from which distortion due to differences in pulse initiation time is removed.

In another aspect of this invention, where the individual units of such a source array are programmed or "timed" to fire at preset intervals of time rather than simultaneously, the actual pulse initiation time of individual source units are compared respectively with desired target values for such pulse initiation as a series of time references. The resultant time differences are again utilized to form a mathematical operator in the frequency domain which is applied to the uncorrected seismic traces in the manner described above so as to remove the distortion resulting from the lack of correspondence between the spacing of the pulse initiation times and the preset intervals.

It is therefore a general object of this invention to provide a system and method for improving the quality of seismic data obtained from an array of seismic sources, activated simultaneously or in other prescribed timed sequence.

It is more a particular object of this invention to provide such a system and method wherein the composite seismic recording is distorted because the acoustic pulses generated in a medium by the individual source units of such an array are not initiated simultaneously or in such prescribed time sequence.

Other and further objects and advantages of this invention will become apparent from a consideration of the detailed description to follow when read in conjunction with the accompanying drawings.

DETAILED DESCRIPTION OF THE PREFERRED EMBODIMENT

Figure 1:
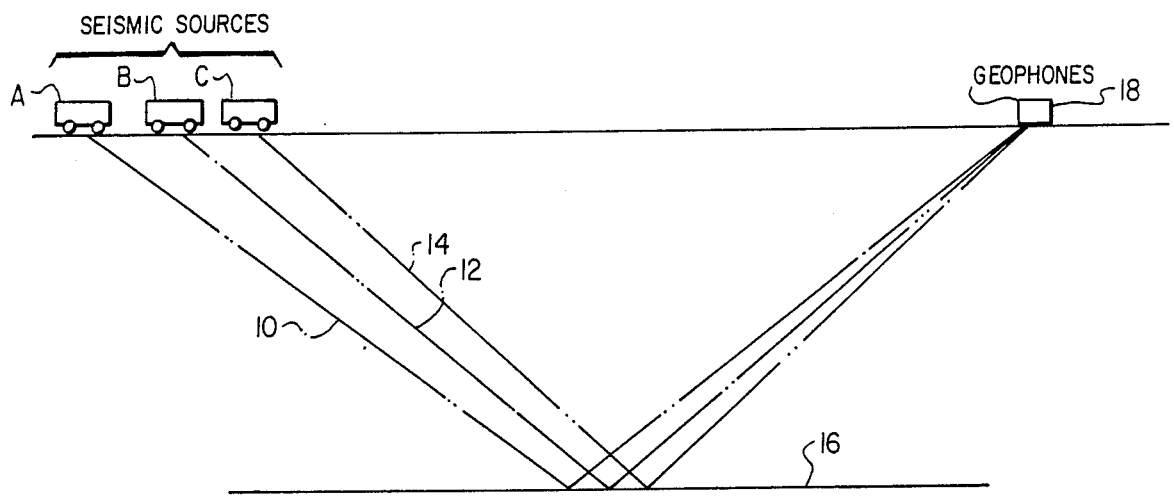
FIG. 1 is a diagrammic view of a field array of surface seismic sources illustrating reflections of seismic waves from a subsurface horizon.

Referring now more particularly to the drawings, FIG. 1 illustrates an array of similar surface seismic sources A, B, and C adapted to generate acoustic pulses in the earth of substantially equivalent wave form as deployed in the field in the practice of the present invention. Seismic waves generated by sources A, B, and C travel in the earth along propagation paths 10, 12, and 14 to subsurface horizon 16 from which they are reflected back to surface geophones 18. The resultant electrical signals are in turn transmitted to a recording truck (not shown) for tape storage.

FIGS. 2(a), 2(b), 2(c), and 2(d) depict respectively in idealized form the time-related individual reflected wave forms attributable to each of sources A, B, and C, and the composite seismic recording which results from the simultaneous activation of these sources. It is assumed for purposes of illustration that sources A, B, and C have been calibrated, in a manner to be explained more fully below, so that each of such sources initiates its respective acoustic pulse at the same instant, for example, 400 milliseconds after receipt of a common firing signal. This interval then becomes a convenient time reference or "target time" with which actual pulse initiation may be compared. In practice, not all the events of pulse initiation occur precisely at the calibrated target time. For example, as illustrated in FIGS. 2(a), 2(b), and 2(c), actual pulse initiation for sources A, B, and C occurs respectively at 400.0, 401.5, and 397.3 milliseconds after receipt of the firing signal at time "0". The composite seismic wave form illustrated in FIG. 2(d) may therefore be viewed as the vertical summation of the individual seismic wave forms shown in FIGS. 2(a), 2(b), and 2(c) as modified by the time shifts in such wave forms resulting from random deviation in actual pulse initiation times from the calibrated or target time. The problem to which this invention is addressed is the removal of the wave form distortion of a composite seismic recording such as illustraed in FIG. 2(d) when caused by such deviation.

Figure 3:
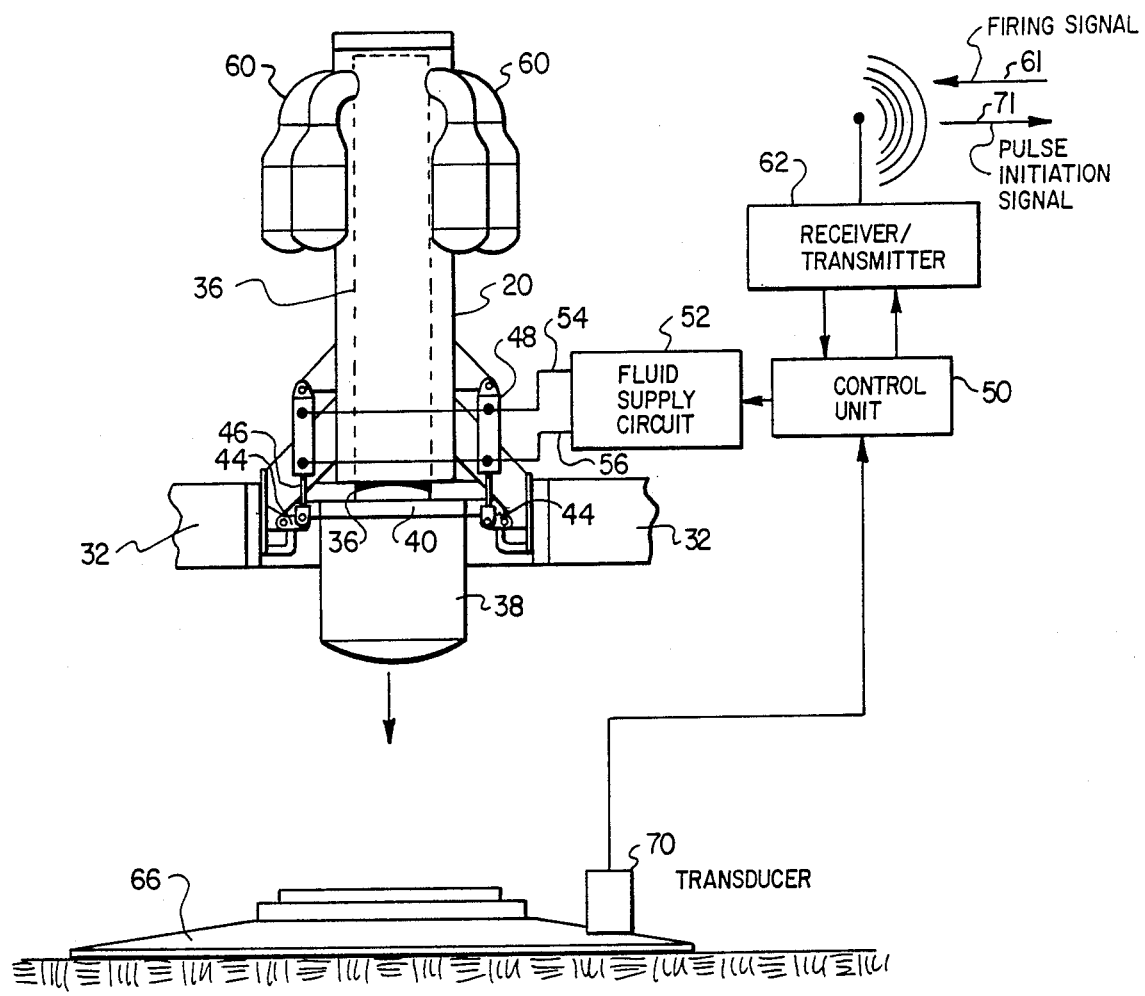
FIG. 3 depicts in simplified form, partially diagrammic, apparatus in which the present invention is utilized.

Referring now to FIG. 3, there is shown one form of impact-type surface seismic source which may be represented by each of similar sources A, B, and C. The general operation of such a source is disclosed in U.S. Pat. No. 4,484,657 issued Nov. 27, 1984 to H. R. Barta and entitled "Acoustic Pulse Generator", such patent, a copy of which is provided herewith, being incorporated herein by reference. More particularly, the source depicted in FIG. 3 comprises hollow upstanding cylindrical actuator housing 20 carried on chassis 32 of a transport vehicle (not shown). An elongated piston 36 extending slidably within housing 20 terminates at its lower end in an enlarged impact mass 38 projecting beneath the bottom end of housing 20. Mass 38 is provided with an enlarged diameter flange 40. Piston 36 is maintained in its uppermost firing position by latches 44 which are engageable with the underside of flange 40 on opposite sides of mass 38. Latches 44 are operatively connected to the lower ends of rods 46 projecting from hydraulic cylinders 48. Actuation of cylinders 48 is accomplished by means of an appropriate electrical signal from control unit 50 which determines the setting of a two-way valve (not shown) in conventional fluid supply circuit 52. In this manner, hydraulic fluid is made to travel in one direction or the other through hydraulic lines 54 and 56 connected respectively to the upper and lower ends of cylinders 48, thus driving rods 46 and operating latches 44. Downward propulsion of piston 36 is provided by high pressure air contained within pressure vessels 60 communicating with the bore of housing 20 through sidewall ports (not shown) blocked by piston 36 in its uppermost firing position. In operation, a firing signal 61 is transmitted simultaneously to each source A, B, and C and received by each receiver/transmitter 62 which is connected to a corresponding control unit 50. The signal 61 is decoded and adjustably delayed by control unit 50 and then sent to activate fluid supply circuit 52 so as to extend piston rods 46 and cause latches 44 to swing away from flange 40. In response, piston 36 falls within housing 20, allowing pressurized air to enter the bore of housing 20 through the now exposed side ports and to propel piston 36 downwardly until mass 38 impacts earth-contacting base plate 66. The instant of such impact is coincident with an elastic deformation of the earth and thus establishes the pulse initiation time for each of sources A, B, and C. Well known means, such as hydraulic lifts, for returning piston 36 to its original position for each succeeding shot have been omitted for simplicity and because such means are not important to an understanding of the present invention.

The electrical delay developed by control unit 50 together with the travel time to target of mass 38 for each source A, B, and C establishes a time interval from receipt of a common firing signal to actual pulse initiation. By test firing each source, one can establish the approximate value of this time interval. Then the delay introduced by each of control units 50 can be adjusted so that, as nearly as possible, within the limits of experimental error, all intervals are the same. Differences in such intervals, however, inevitably remain, or develop over the course of a seimic survey. As noted above in the example of FIG. 2, for each shot any fixed period of time after receipt of firing signal 61 can be designated as a time reference with which each of these differing intervals may be compared. By choosing the calibrated value of this interval as a time reference, the resultant difference values are kept small, which is desirable in subsequent computer operations.

Figure 2:
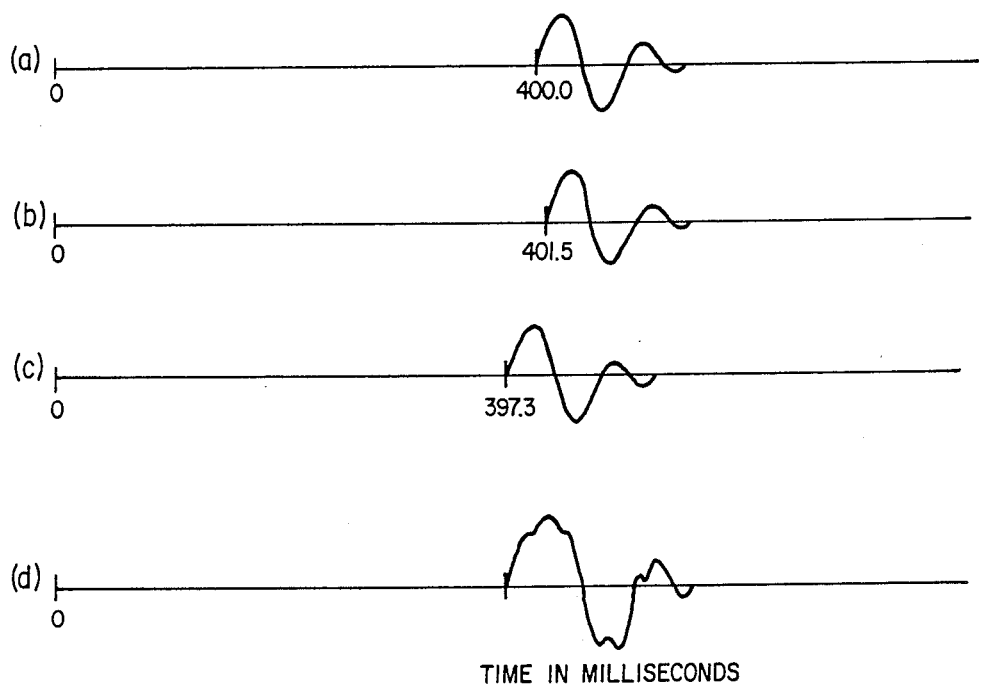
FIGS. 2(a), 2(b), 2(c), and 2(d) depict idealized seismic wave forms resulting from the reflections shown in FIG. 1.
Figure 4:
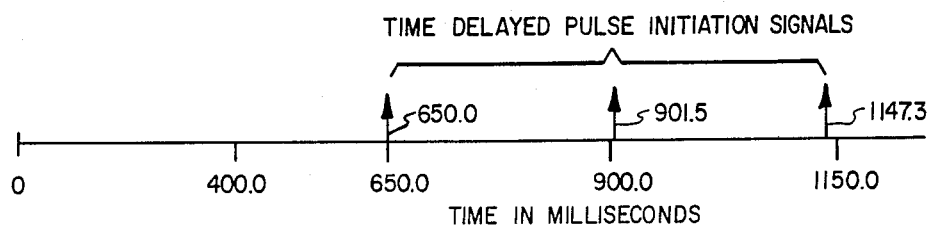
FIG. 4 depicts diagrammatically the recorded and time-delayed pulse initiation signals for the sources in FIG. 1.

The impact of mass 38 initiates each of the seismic signals shown in FIGS. 2(a), (b), and (c). It also triggers electroacoustic tranducer 70 mounted on baseplate 66, thereby generating a pulse initiation signal 71 which is sent to control unit 50 which in turn, after a further delay, passes the signal to receiver/transmitter 62 for communication to a recording truck (not shown). To prevent overlap of pulse initiation signals from sources A, B, and C, the control unit 50 for each such source preferably delays its pulse initiation signal 71 by a different predetermined increment of time. Thus with particular reference to the example of FIG. 4, the control units 50 for sources A, B, and C, are set such that their pulse initiation signals 71 are delayed by 250, 500, and 750 milliseconds respectively, before they are transmitted for remote recording. However, because of differences in the times of occurrence of the pulse initiation events among sources A, B, and C, actual recording occurs at 650.00, 901.5, and 1147.3 milliseconds respectively measured from receipt of firing signal. In subsequent computer processing, these delays are automatically compensated for so that the real time relation between such pulse initiation signals 71, as indicated in FIG. 2, determines the results of such processing. As will now be explained, these measurements provide a means for overcoming the degradation in the quality of the composite seismic recording depicted in FIG. 2(d).

Figure 5:
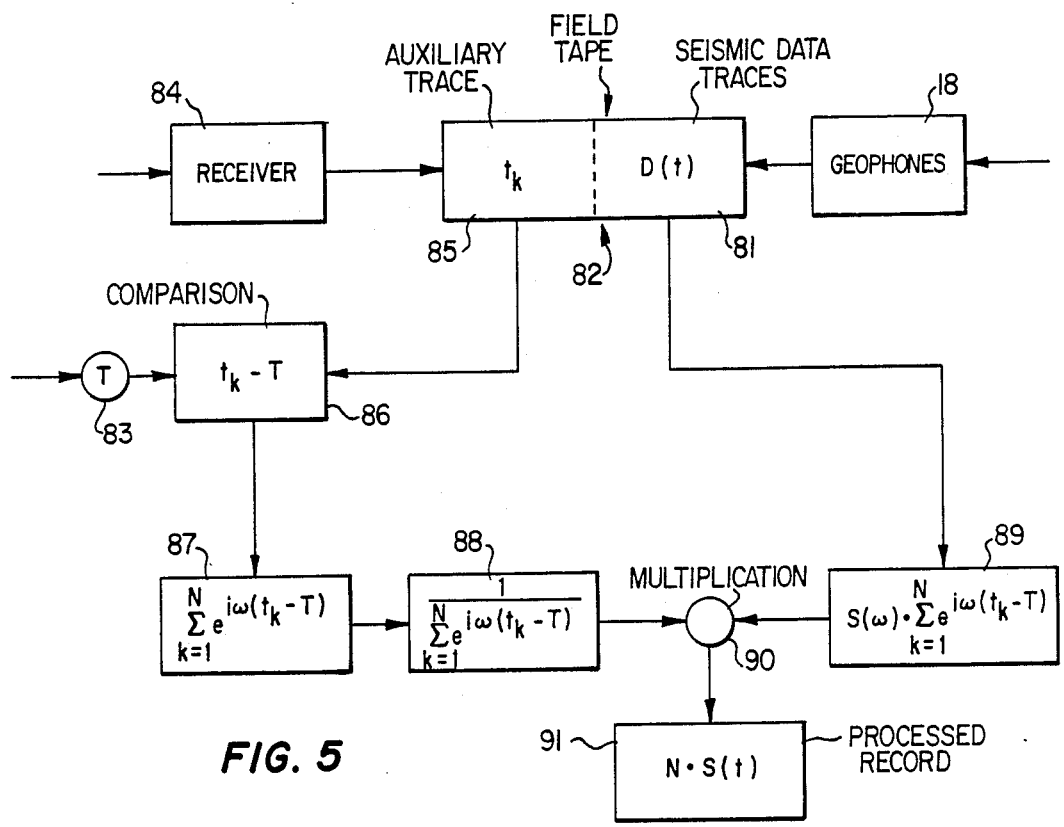
FIG. 5 illustrates in block diagrammatic form the various data processing stages in accordance with the present invention.

Turning now to FIG. 5, geophones 18 convert the seismic reflections from sources A, B, and C, into a signal D(t) corresponding to the wave form of FIG. 2(d) which is stored as digital seismic data (indicated by reference numeral 81) of field tape 82. A preselected time reference T, established as the expiration of a fixed interval after receipt of the firing signal 61 (400 milliseconds in the example of FIGS. 2 and 4) is stored in computer memory as indicated by reference numeral 83. With delays as noted, the aforementioned pulse initiation signals 71 are communicated by radio to receiver 84 which generates corresponding voltage spikes, as shown on FIG. 4, for storage in auxiliary trace 85 of field tape 82.

The measured times of occurrence $t_k$, of each of these pulse initiation signals 71 is compared to the time reference, T, as indicated by reference numeral 86. The resultant time differences $(t_k-T)$ are then used to construct an operator which is applied to the summed field record to remove the wave form distortion caused by these differences. The underlying model for this summed field record assumed in this approach is expressed in the frequency domain by:

$$D(\omega) = S(\omega) \cdot \sum_{k=1}^{N} e^{i\omega(t_k-T)}$$

where
  $D(\omega)$=Fourier transform of the summed field record
  $S(\omega)$=Fourier transform of the field record for a single shot of one source unit (an unknown)
  $\omega$=frequency
  T=a time reference representing the expiration of a fixed interval after receipt of firing signal
  $t_k$=measured pulse initiation time of the k-th source unit
  N=number of source units The salient assumptions of this model are the avilability of measured times $t_k$ and the substantial constancy of the source wave form for all shots of all units. Given this formulation, the observed time variations can be corrected by applying a single frequency domain operator of matching characteristics to all traces of the summed field record D(W). Operator 87, having the form:

$$\sum_{k=1}^{N} e^{i\omega(t_k-T)}$$

is created in a digital computer by literally inserting the measured values of the quantity $(t_k-T)$ for all source units into the above formula to yield a sum of terms each having a numerical value in the frequency domain.

This operator 87 is then mathematically inverted to form an inverse operator 88 of the form:

$$G(W) = \frac{1}{\sum_{k=1}^{N} e^{i\omega(t_k-T)}}$$

The Fourier transform of the summed seismic field record D(t) on traces 81, shown at reference numeral 89, is then multiplied by operator 88 as shown by reference numeral 90. The resultant product is of the form $N \cdot S(\omega) = G(\omega) \cdot D(\omega)$ where N·S ($\omega$) represents the summed field record in the frequency domain with the effect of pulse initiation time differences removed. The inverse Fourier transform of this product yields a processed field record 91 of the form N·S(t) which is the desired end result in the time domain. In other words, N·S(t) represents the sum of N traces each of the form S(t) wherein no time shifts have occurred in the respective pulse initiation times of individual units of an array of N sources. In the example of FIG. 2, this is equivalent to realigning traces 2(a), 2(b), and 2(c) so that they are no longer time shifted.

One problem with the above described procedure is the possibility that the denominator in the expression for $G(\omega)$ may approach "0", so that the value of $G(\omega)$ approaches infinity. So long as the value $(t_k-T)$ is less than the sampling interval used to record the digital data, this problem does not exist. However for values of $(t^k-T)$ greater than the digital sampling intervals, this problem may be avoided by specifying a maximum permissible value for the operator 88. Mathematically, this is effected by replacing $|G(\omega)|$ in the computer by a specified maximum value whenever $|G(\omega)|$ exceeds this maximum.

Normally, T is the same value for all source units for land multi-seismic recording operations, since simultaneous pulse initiation is usually desired. Where, however, the individual units of an array of seismic sources are programmed to fire at prescribed time intervals, the single value, T, may be replaced by a series of time references, $T_k$, separated in time by such intervals. In that event, the steps described and illustrated in FIG. 5 are modified by substituting the successive prescribed value of $T_k$ wherever the value T appears. In other words, $T_k$ represents the time reference value for the k=th source unit. Otherwise all operations carried out are identical to those described with respect to FIG. 5. This system and method enables the explorationist to compensate for random deviations of individual sources from the desired time separation of successive pulse generations. This may be of significance in beam steering applications and other seismic surveying where modifications in firing sequence are based upon an assumed earth model.

It should be noted that while the system and technique described herein is of general application, it is of particular advantage when used in connection with sources adapted to generate seismic energy in the earth along inclined paths. In operations using such sources, which depend upon addition and subtraction of recordings to produce various shear and compressional records, cancellation of undesired energy modes during processing is critical.

It should further be emphasized that all of the processing steps described with reference to FIG. 5, including determination of Fourier transforms, complex multiplication and the like may readily be performed with the aid of a digital computer and are well within the skill of the seismic data processing art.

Although the invention has been described in relation to a particular type of seismic source, it is to be understood that such description is for illustrative purpose only. Those skilled in this art will be able to adapt the invention to a variety of seismic sources and to make modifications in the components and processing steps disclosed without departing from the scope of this invention as set forth in the appended claims.

What is claimed is:

1. A system for removing wave form distortion from a composite seismic record generated by an array of seismic sources simultaneously fired by means of a common signal and adapted to initiate acoustic pulses of substantially equivalent wave form in a medium, wherein such distortion is caused by lack of simultaneity in the time of initiation of such pulses, the system comprising:
   (a) means respectively responsive to such pulse initiation by each of such sources for generating a series of signals representative thereof;
   (b) means for recording such pulse initiation signals;
   (c) means for comparing the time of occurrence of each of such signals with a preselected reference time having a fixed relation to the time of occurrence of the common firing signal so as to obtain a corresponding number of time difference values:
   (d) means for utilizing such time difference values to construct an inverse operator in the frequency domain of the form:

$$\frac{1}{\sum_{k=1}^{N} e^{i\omega(t_k - T)}}$$

where
   $\omega$ = frequency
   T = a reference time occuring a fixed interval after the receipt of a common firing signal
   $t_k$ = the measured pulse initiation time of the k-th source unit
   N = number of source units;
   (e) means for determining the Fourier transform of the composite seismic record;
   (f) means for multiplying the inverse operator with such Fourier transform to form a resultant product; and
   (g) means for determining the inverse Fourier transform of the resultant product so as to produce a corrected composite seismic record.

2. A system as in claim 1 wherein the sources are land surface sources.

3. A system as in claim 1 wherein the sources are marine sources.

4. A system for removing wave form distortion from a composite seismic record generated by an array of seismic sources adapted to generate acoustic pulses of substantially equivalent form in a medium, such sources being programmed to fire at preset intervals, wherein such distortion is caused by lack of correspondence between the times of initiation of such pulses and such intervals, the system comprising:
   (a) means respectively responsive such pulse initiation by each of such sources for generating a series of signals representative thereof;
   (b) means for recording such pulse initiation signals;
   (c) means for comparing the time of occurrence of each of such signals with a corresponding series of preselected reference times for each such pulse initiation to obtain a corresponding number of time difference values, wherein such preselected reference times are separated by the preset time intervals;
   (d) means for uitlizing such time difference values to construct an inverse operator in the frequency domain in the form:

$$\frac{1}{\sum_{k=1}^{N} e^{i\omega(t_k - T_k)}}$$

where
   $\omega$ = frequency
   $T_k$ = a preselected time reference for the k-th source unit
   $t_k$ = the measured pulse initiation time of the k-th source unit
   N = number of source units;
   (e) means for determining the Fourier transform of the composite seismic record;
   (f) means for multiplying the inverse operator with such Fourier transform to form a resultant product; and
   (g) means for determining the inverse Fourier transform of the resultant product so as to produce a corrected composite seismic record.

5. The system as claimed in claim 1 wherein the value of the inverse operator is not permitted to exceed a preselected maximum value irrespective of the value of any of the quantities, (thd k−T).

6. The system as claimed in claim 1 wherein the sources are individually calibrated so that the measured interval between the common firing signal and the time of pulse initiation is the same for all such sources and wherein the preselected reference time is chosen as the expiration of such measured interval.

7. A method for substantially reducing the distortion in the composite seismic recording produced by an array of simultaneously fired seismic sources in operative contact with a medium wherein differences exist in the respective times at which said sources initiate an acoustic pulse in the medium, comprising the steps of:
   (a) determining the time intervals between said pulse initiation times;
   (b) generating an operator in the frequency domain based upon said time intervals having the form:

$$\sum_{k=1}^{N} e^{i\omega(t_k - T)}$$

where
   $\omega$ = frequency
   T = a reference time occuring a fixed interval after the receipt by said sources of a common firing signal
   $t_k$ = the measured pulse initiation time of the k=th source unit; and
   N = the number of source units;
   (c) computing the inverse of said operator;
   (d) multiplying said inverse operator with the Fourier transform of said composite seismic recording to form a resultant product; and
   (e) determining the inverse Fourier transform of the resultant product.

8. The method of claim 7 wherein the seismic sources are surface sources and the medium is earth.

9. The method of claim 8 wherein the seismic sources are marine sources.

UNITED STATES PATENT AND TRADEMARK OFFICE
CERTIFICATE OF CORRECTION

PATENT NO. : 4,733,747
DATED : March 29, 1988
INVENTOR(S) : Michael D. McCormack It is certified that error appears in the above-identified patent and that said Letters Patent is hereby corrected as shown below:

Column 8, Claim 5, line 4, "(thd k - T)" should read --$(t_k - T)$--.

Signed and Sealed this

Tenth Day of January, 1989

Attest:

DONALD J. QUIGG

*Attesting Officer*  *Commissioner of Patents and Trademarks*